(12) United States Patent
Wolf et al.

(10) Patent No.: US 11,700,967 B2
(45) Date of Patent: Jul. 18, 2023

(54) METHOD AND APPARATUS FOR FILLING A STEAM CHAMBER

(71) Applicant: AccuTemp Products, Inc., Fort Wayne, IN (US)

(72) Inventors: Larry R. Wolf, Avilla, IN (US); Bradley D. Snider, New Haven, IN (US)

(73) Assignee: AccuTemp Products, Inc., Fort Wayne, IN (US)

( * ) Notice: Subject to any disclaimer, the term of this patent is extended or adjusted under 35 U.S.C. 154(b) by 525 days.

(21) Appl. No.: 15/076,005

(22) Filed: Mar. 21, 2016

(65) Prior Publication Data
US 2016/0262563 A1  Sep. 15, 2016

Related U.S. Application Data

(62) Division of application No. 11/856,186, filed on Sep. 17, 2007, now Pat. No. 9,289,094.

(51) Int. Cl.
*A47J 27/16* (2006.01)
*A47J 37/06* (2006.01)

(52) U.S. Cl.
CPC ............ *A47J 27/16* (2013.01); *A47J 37/067* (2013.01)

(58) Field of Classification Search
CPC ..... A47J 37/067; A47J 27/16; F28D 15/0283; F01M 11/045; F04F 3/00; Y10T 137/3109
USPC ............... 99/330; 53/127, 510, 79; 417/118; 137/205; 141/98; 184/1.5
See application file for complete search history.

(56) References Cited

U.S. PATENT DOCUMENTS

| | | | | | |
|---|---|---|---|---|---|
| 1,247,101 | A | * | 11/1917 | Fine | A47J 36/2405 126/33 |
| 1,332,319 | A | * | 3/1920 | Carpenter | F02M 37/02 137/205 |
| 1,405,181 | A | * | 1/1922 | Bristol | G05D 23/185 236/46 R |
| 2,152,534 | A | * | 3/1939 | Carvalho | B67B 3/22 53/407 |

(Continued)

OTHER PUBLICATIONS

Armstrong Catalog 2004 Edition, Armstrong Steam and Condensate Group, Three Rivers, Michigan, 2 pages, www.armstrong-intl.com.
Larry R. Wolf, Statement Submitted with Information Disclosure Statement regarding Accutemp Products Inc. activities prior to Sep. 17, 2006, signed Oct. 5, 2015, 1 page.

*Primary Examiner* — Eric S Stapleton
(74) *Attorney, Agent, or Firm* — Faegre Drinker Biddle & Reath LLP

(57) ABSTRACT

A method and apparatus for filling a steam chamber. In one exemplary embodiment, a steam chamber is placed in selective communication with a vacuum pump and a heat transfer medium, such as a source of deaerated water. The steam chamber is then placed in communication with the vacuum pump, which draws a vacuum on the steam chamber and begins removing air from the interior thereof. Once a sufficient vacuum has been drawn on the steam chamber and substantially all of the air removed therefrom, the steam chamber may be placed in communication with the heat transfer medium. In one exemplary embodiment, the heat transfer medium is deaerated water. A predetermined amount of heat transfer medium is then allowed to fill the steam chamber. Once the predetermined amount of deaerated water has been received within the steam chamber, a steam chamber may be sealed.

14 Claims, 5 Drawing Sheets

(56) References Cited

U.S. PATENT DOCUMENTS

| | | | | |
|---|---|---|---|---|
| 2,318,380 A * | 5/1943 | Davis | A61L 2/04 | 422/33 |
| 2,318,381 A * | 5/1943 | Davis | A61B 17/06114 | 422/105 |
| 2,353,985 A * | 7/1944 | Barr | B65B 31/027 | 53/101 |
| 2,552,360 A * | 5/1951 | Zichis | F26B 5/06 | 165/287 |
| 2,622,590 A * | 12/1952 | Corbet | C11B 1/12 | 126/343.5 A |
| 2,664,911 A * | 1/1954 | Thompson | B60P 3/243 | 137/205 |
| 2,783,853 A * | 3/1957 | Schaub | B01D 19/0047 | 96/205 |
| 3,048,928 A * | 8/1962 | Copson | F26B 5/06 | 219/679 |
| 3,091,098 A * | 5/1963 | Bowers | B01D 3/007 | 159/24.2 |
| 3,311,991 A * | 4/1967 | Gidlow | F26B 5/06 | 34/292 |
| 3,342,703 A * | 9/1967 | Leach | C02F 1/04 | 159/1.1 |
| 3,603,767 A * | 9/1971 | Scicchitano | A47J 27/10 | 126/246 |
| 3,617,700 A * | 11/1971 | Hooper | F24H 1/202 | 392/485 |
| 3,797,086 A * | 3/1974 | Asselman | F28D 15/0283 | 165/104.26 |
| 3,950,963 A * | 4/1976 | Sutherland | F25D 31/003 | 165/74 |
| 3,968,787 A * | 7/1976 | Basiulis | A47J 37/067 | 126/351.1 |
| 4,020,563 A * | 5/1977 | Hoefer | F26B 5/045 | 219/243 |
| 4,245,147 A * | 1/1981 | Cummings | A47J 27/14 | 126/378.1 |
| 4,445,428 A * | 5/1984 | Buford | A47J 37/067 | 126/378.1 |
| 4,761,225 A * | 8/1988 | Breslin | B01D 17/0214 | 166/265 |
| 4,818,116 A * | 4/1989 | Pardo | B01F 7/00166 | 15/246.5 |
| 4,955,361 A * | 9/1990 | Sotani | A47J 27/024 | 126/351.1 |
| 4,982,769 A * | 1/1991 | Fournier | A61J 1/20 | 141/27 |
| 5,195,427 A * | 3/1993 | Germano | B65B 31/047 | 141/65 |
| 5,201,348 A * | 4/1993 | Lurz | B01D 61/18 | 141/130 |
| 5,235,903 A * | 8/1993 | Tippmann | A21B 3/04 | 126/20 |
| 5,318,792 A * | 6/1994 | Tippmann | A21B 3/04 | 219/401 |
| 5,405,038 A * | 4/1995 | Chuang | B65B 31/047 | 137/522 |
| 5,411,753 A * | 5/1995 | Tippmann | A21B 3/04 | 426/510 |
| 5,743,014 A * | 4/1998 | Giammaruti | F28D 15/0283 | 29/890.032 |
| 5,765,608 A * | 6/1998 | Kristen | B65B 31/047 | 141/198 |
| 5,772,402 A * | 6/1998 | Goodman | F01M 11/045 | 137/205 |
| 5,895,868 A * | 4/1999 | Giammaruti | F28D 15/0283 | 73/863.81 |
| 5,964,255 A * | 10/1999 | Schmidt | B65B 31/047 | 141/65 |
| 6,079,372 A * | 6/2000 | Bekedam | B01D 19/001 | 122/451 R |
| 6,103,289 A * | 8/2000 | Tippmann | A47J 37/067 | 426/510 |
| 6,145,431 A * | 11/2000 | Tippmann | A47J 37/067 | 99/330 |
| 6,148,875 A * | 11/2000 | Breen | B65B 25/046 | 141/192 |
| 6,389,958 B1 * | 5/2002 | Ono | A23L 3/003 | 422/105 |
| 6,520,071 B1 * | 2/2003 | Lanza | B65B 31/047 | 141/198 |
| 6,539,839 B1 * | 4/2003 | Tippmann | A47J 37/0611 | 99/331 |
| 6,619,189 B1 * | 9/2003 | Tippmann | A23L 3/00 | 126/20 |
| 6,626,088 B2 * | 9/2003 | Ono | A23L 3/10 | 99/330 |
| 6,725,632 B2 * | 4/2004 | Glucksman | B65B 31/028 | 251/251 |
| 6,789,690 B2 * | 9/2004 | Nieh | B65D 81/2015 | 215/228 |
| 6,792,982 B2 * | 9/2004 | Lincoln | F04B 17/00 | 141/114 |
| 6,971,418 B2 * | 12/2005 | De Costa | A47J 47/10 | 141/198 |
| 6,994,227 B2 * | 2/2006 | Kwon | A47J 47/10 | 116/309 |
| 7,003,928 B2 * | 2/2006 | Patterson | B65B 31/046 | 53/405 |
| 7,021,027 B2 * | 4/2006 | Higer | B65B 31/046 | 53/434 |
| 7,048,136 B2 * | 5/2006 | Havens | B65D 51/1644 | 206/524.8 |
| 7,076,929 B2 * | 7/2006 | Patterson | B65B 31/046 | 53/405 |
| 7,087,130 B2 * | 8/2006 | Wu | B65B 9/042 | 156/204 |
| 7,127,875 B2 * | 10/2006 | Cheung | B65B 31/047 | 53/510 |
| 7,131,250 B2 * | 11/2006 | Kahn | B65B 31/046 | 53/512 |
| 7,138,025 B2 * | 11/2006 | Wu | B32B 3/26 | 156/204 |
| 7,490,452 B2 * | 2/2009 | Alipour | B29C 65/18 | 53/405 |
| 7,538,300 B1 * | 5/2009 | Tippmann, Jr. | A47J 36/20 | 126/378.1 |
| 7,591,121 B2 * | 9/2009 | Lin | F28D 15/0283 | 53/127 |
| 7,614,203 B2 * | 11/2009 | Oltrogge | B65D 81/2038 | 53/139.2 |
| 7,625,459 B2 * | 12/2009 | Wu | B32B 27/08 | 156/244.24 |
| 7,677,165 B2 * | 3/2010 | Adams | A47J 47/10 | 141/65 |
| 7,836,876 B2 * | 11/2010 | Schellenberg | A47J 39/006 | 126/268 |
| 8,234,841 B2 * | 8/2012 | Wild | B65B 55/06 | 53/284.7 |
| 8,807,163 B2 * | 8/2014 | Bell | F04F 3/00 | 137/487.5 |
| 9,056,419 B2 * | 6/2015 | Bell | B29C 47/92 | |
| 9,289,094 B2 * | 3/2016 | Wolf | A47J 37/067 | |
| 9,346,135 B2 * | 5/2016 | Jouhara | B01D 19/0031 | |
| 2004/0000337 A1 * | 1/2004 | Cooper | A62C 37/50 | 137/377 |
| 2004/0168685 A1 * | 9/2004 | Lange | F28D 15/0241 | 126/351.1 |
| 2005/0112269 A1 * | 5/2005 | Ishibashi | C12Y 302/01002 | 426/618 |
| 2006/0177299 A1 * | 8/2006 | Hsu | F28D 15/0283 | 414/804 |
| 2009/0071345 A1 * | 3/2009 | Wolf | A47J 27/16 | 99/330 |
| 2010/0133254 A1 | 6/2010 | Lehman et al. | | |
| 2016/0262563 A1 * | 9/2016 | Wolf | A47J 27/16 | |

* cited by examiner

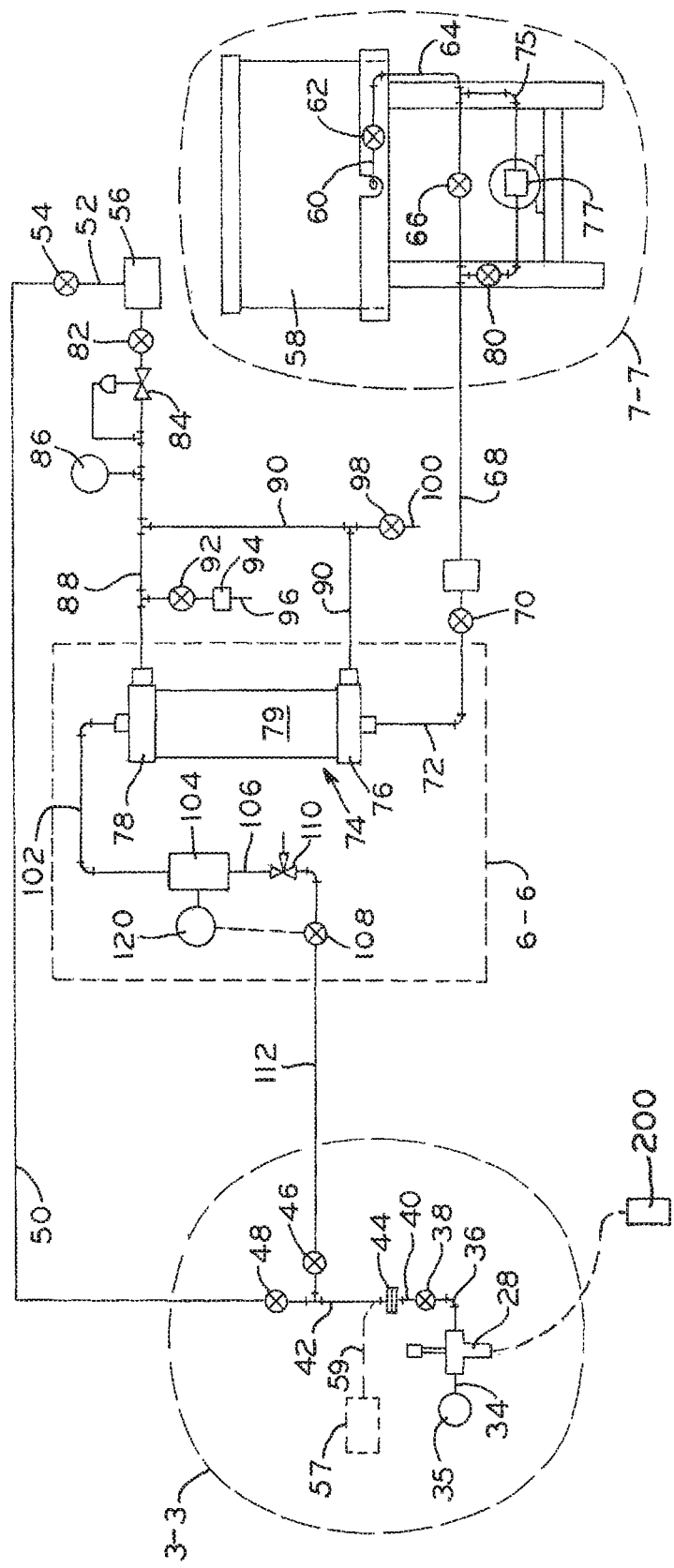
FIG_2

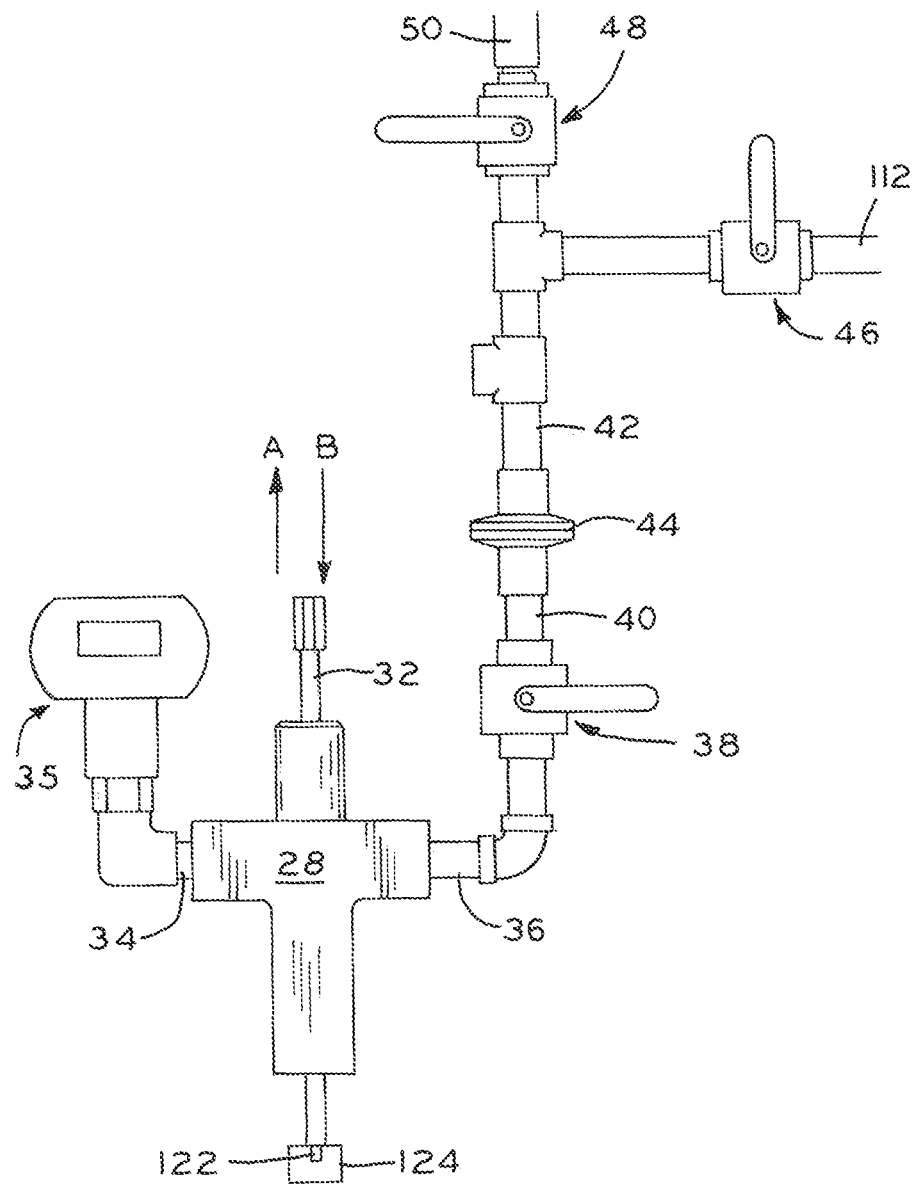
FIG_3

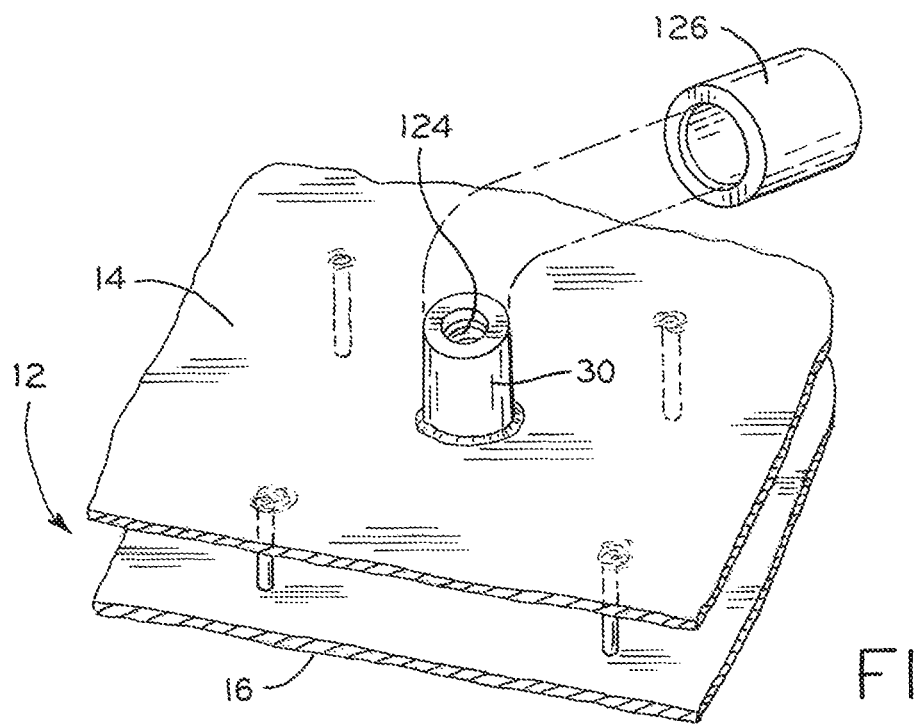
FIG_4
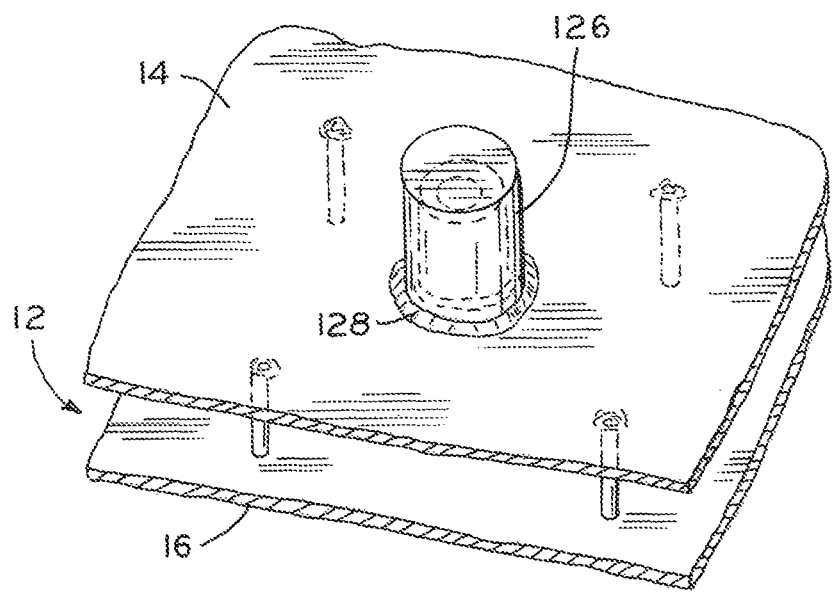
FIG_5

METHOD AND APPARATUS FOR FILLING A STEAM CHAMBER

This application is a divisional application of U.S. patent application Ser. No. 11/856,186, filed Sep. 17, 2007, the full disclosures which are incorporated herein by reference in their entirety.

BACKGROUND

1. Field of the Invention

The present invention relates to a method and apparatus for filling a steam chamber.

2. Description of the Related Art

Steam chambers, such as those used in manufacturing steam griddles, are filled with water and/or other boilable fluids and sealed. By activating a heating element, the fluid within the steam chamber is converted from a liquid to a gas, which rises within the steam chamber. When the gas contacts the top surface of the steam chamber, heat is transferred thereto. The opposing side of the top surface, i.e., the surface on the exterior of the steam chamber, may act as a cooking surface upon which food is placed to be cooked. During operation of the steam chamber, any air that is sealed within the chamber may prevent the rising gas from directly contacting the top surface, resulting in a cold spot on the cooking surface. These cold spots create areas of lower temperature on the cooking surface of the steam chamber, which may increase the cooking time of food positioned thereon.

SUMMARY

The present invention relates to a method and apparatus for filling a steam chamber. In one exemplary embodiment, a steam chamber is placed in selective communication with a vacuum pump and a heat transfer medium, such as a source of deaerated water. The steam chamber is then placed in communication with the vacuum pump, which draws a vacuum on the steam chamber and begins removing air from the interior thereof. Once a sufficient vacuum has been drawn on the steam chamber and substantially all of the air removed therefrom, the steam chamber may be placed in communication with the heat transfer medium. In one exemplary embodiment, the heat transfer medium is deaerated water. A predetermined amount of heat transfer medium is then allowed to fill the steam chamber. Once the predetermined amount of deaerated water has been received within the steam chamber, the steam chamber may be sealed.

Advantageously, by using the combination of a vacuum to remove air from the steam chamber and filling the chamber with deaerated water, the likelihood of having any substantial amount of air within the steam chamber after sealing the same is lessened. For example, even when substantially all of the air within a steam chamber is removed, when the water within the steam chamber is heated, dissolved oxygen and other constituents of air may be released in gaseous form. This release of the dissolved constituents of air in the gas phase creates pockets within the steam chamber adjacent the cooking surface. As a result, cold spots may be formed on the cooking surface. By substantially eliminating both the air from the steam chamber and the dissolved constituents of air from the water, the formation of cold spots on the cooking surface is substantially eliminated. This provides the ability to create and maintain a uniform temperature across the entirety of the cooking surface. This uniform temperature is advantageous in that it provides standardized cooking times and facilitates more accurate temperature adjustment and control.

In one form thereof, the present invention provides an apparatus for filling a steam chamber having a cooking surface and a fill port, the apparatus including a source of deaerated water; a vacuum pump; and a valve configured for connection to the steam chamber, said valve in selective communication with said source of deaerated water and said vacuum pump.

In yet another form thereof, the present invention provides a method of filling a steam chamber, including the steps of drawing a vacuum on the steam chamber to substantially evacuate the steam chamber; filling the substantially evacuated steam chamber with a predetermined amount of fluid transfer medium; and sealing the steam chamber.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein:

FIG. 2 is a schematic view of the apparatus used to fill the steam chamber of FIG. 1;

FIG. 3 is a fragmentary perspective view of a portion of the apparatus shown schematically within dashed line 3-3 of FIG. 2;

FIG. 4 is a fragmentary assembly view of the steam chamber of FIG. 1 and a cap;

FIG. 5 is a fragmentary assembled view of the steam chamber and cap of FIG. 4;

Corresponding reference characters indicate corresponding parts throughout the several views. The exemplification set out herein illustrates a preferred embodiment of the invention, in one form, and such exemplification is not to be construed as limiting the scope of the invention in any manner.

DETAILED DESCRIPTION

Figure 1:
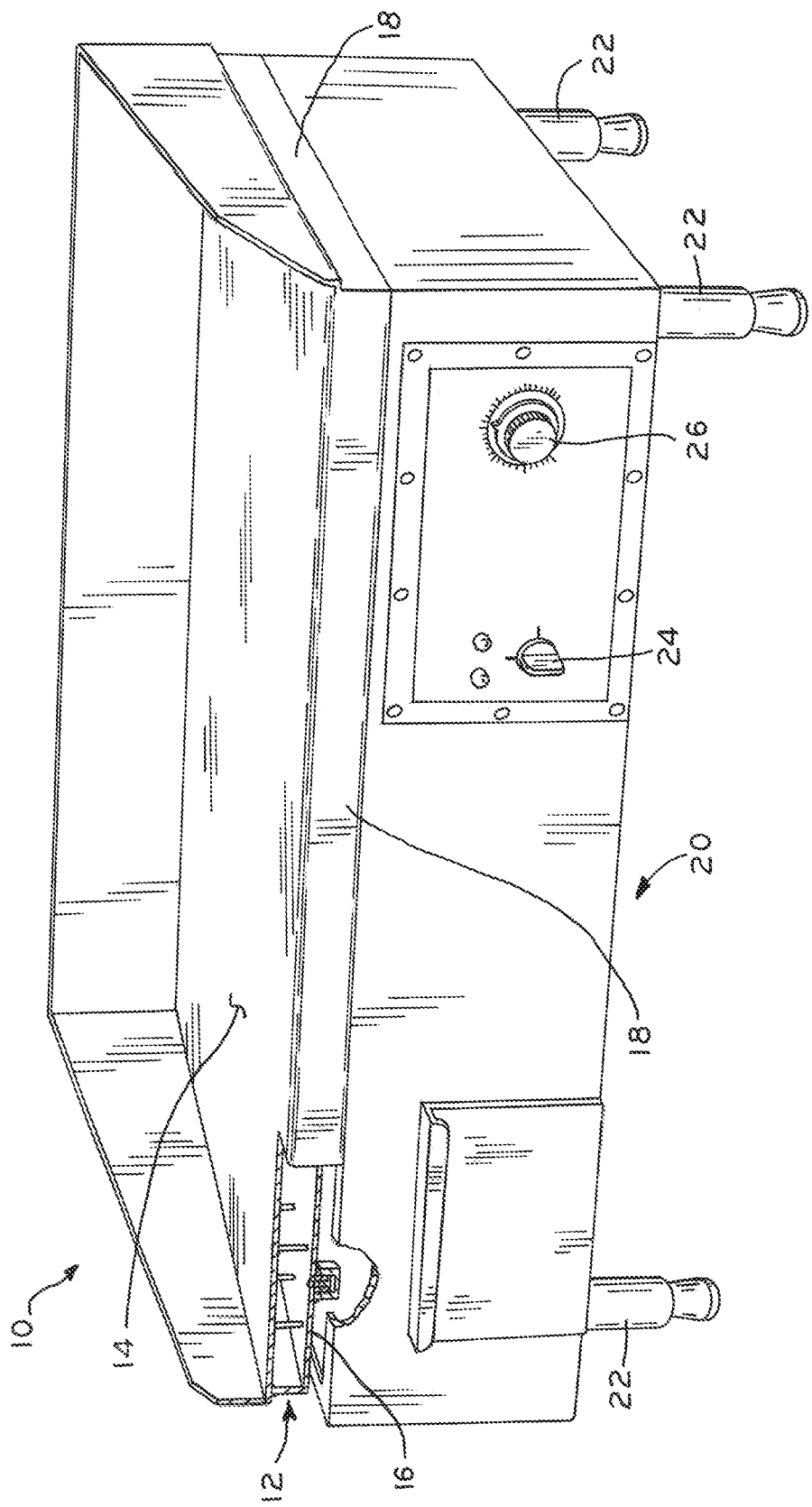
FIG. 1 is a perspective view of a steam griddle including a steam chamber.
Figure 7:
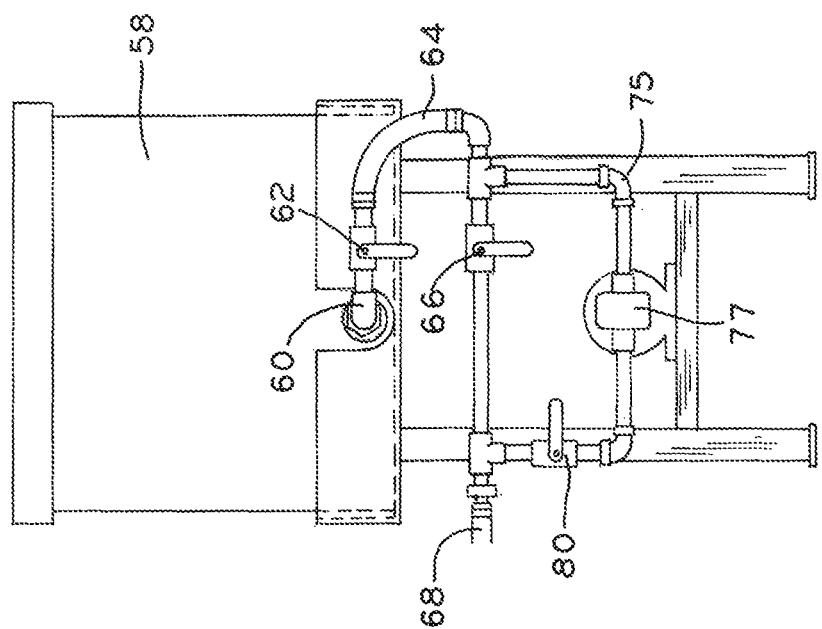
FIG. 7 is a fragmentary perspective view of a portion of the apparatus shown schematically within dashed line 7-7 of FIG. 2.
Figure 6:
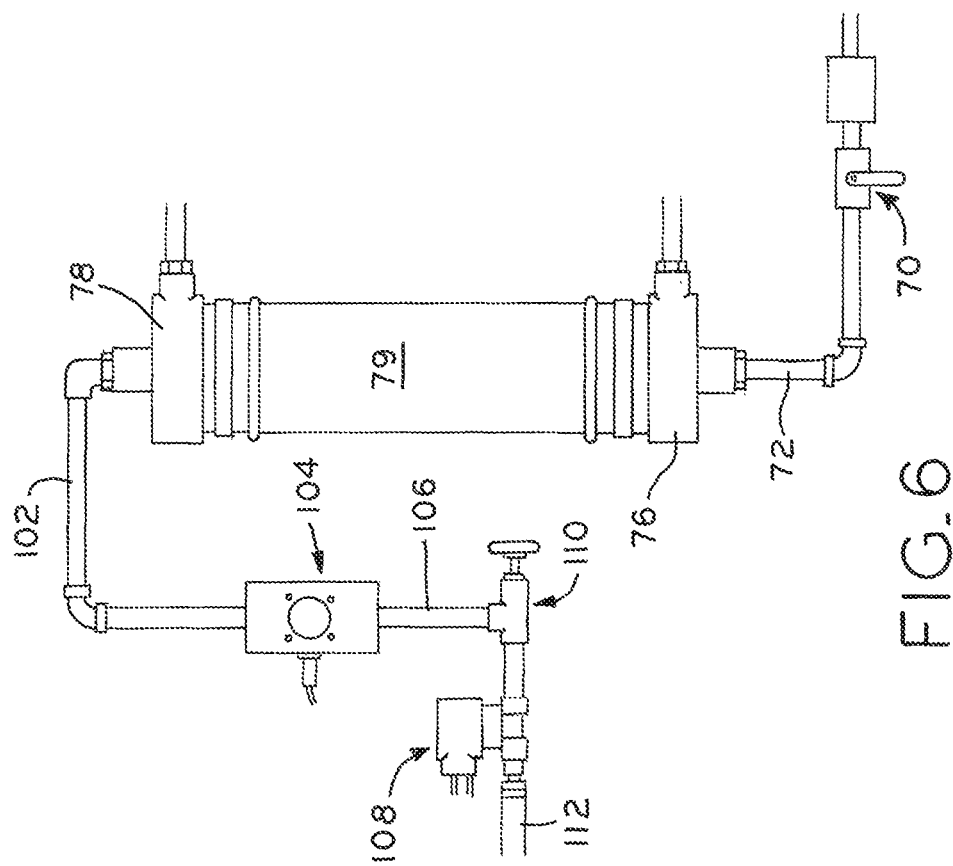
FIG. 6 is a fragmentary perspective view of a portion of the apparatus shown schematically within dashed line 6-6 of FIG. 2.

Referring to FIG. 1, steam griddle 10 is depicted including steam chamber 12 having top and bottom walls including a first, top surface, such as cooking surface 14, and a second, bottom surface 16, respectively. While described and depicted herein with specific reference to steam chamber 12 of steam griddle 10, the present invention may be utilized in conjunction with any steam heated food service or food preparation device, such as a steam jacketed kettle, e.g., the steam jacketed kettle 200 (FIG. 2). Cooking surface 14 and bottom surface 16 are connected by a plurality of walls 18. Steam chamber 12 is supported by frame 20 having a plurality of legs 22 extending therefrom. Contained within steam chamber 12 or positioned adjacent bottom surface 16 of steam chamber 12 is a heating element (not shown), such as an electric coil or gas burner. Actuation of knobs 24, 26 activate the heating element to boil a heat transfer medium, such as deaerated water, contained within steam chamber 12. As the heat transfer medium evaporates, the resulting gas rises in the direction of cooking surface 14 and imparts heat to cooking surface 14 for cooking food placed thereon.

Referring to FIG. 2, a schematic is shown representing an apparatus for evacuating and filling steam chamber 12, with deaerated water as the heat transfer medium. Referring to FIGS. 2 and 3, T-valve 28 is configured for threaded engagement with fill port 30, shown in FIG. 4, of steam chamber 12. In another exemplary embodiment, T-valve 28 is configured for flange engagement with fill port 30. Specifically, T-valve 28 includes an internally threaded bore designed to threadably engage the exterior surface of fill port 30. While a T-valve is described and depicted herein for connection with fill port 30, any known valve design capable of starting and stopping the flow of a fluid therethrough, such as a ball valve, may be used. Once T-valve 28 is connected to fill port 30, rod 32 is moved upward in the direction of arrow A (FIG. 3) to place steam chamber 12 in fluid communication with pipes 34, 36. Connected to T-valve 28 by pipe 34 is pressure gauge 35. This allows for the operator to readily determine the pressure within T-valve 28 and, correspondingly, vacuum chamber 12.

Connected to the opposite side of T-valve 28 by pipe 36 is ball valve 38, which is actuated to control the transfer of fluid from pipe 40 to steam chamber 12. Connecting pipe 40 to pipe 42 is flange connection 44. Flange connection 44 is of the type commonly used with high vacuum service applications to prevent outside air contaminants from infiltrating the system when the same is placed under vacuum. Connected to pipe 42 are ball valve 48, which is connected to a vacuum source, and ball valve 46, which is connected to a source of deaerated water as described below. Specifically, referring to FIG. 2, connected to ball valve 48 is pipe 50, ball valve 54, and pipe 52. Vacuum pump 56 is connected to pipe 52 and, when ball valves 54, 48, 38 are open, draws a vacuum on steam chamber 12, as described in detail below. In one exemplary embodiment, vacuum pump 56 is a two-stage vacuum pump. In this embodiment, vacuum pump 56 used both stages to draw a vacuum on steam chamber 12 and uses a single stage to draw a vacuum on deaerator 74, as described in detail below. Additionally, a vacuum gauge may be added to pipe 50 to determine that vacuum pump 56 has achieved a sufficient level of vacuum in pipe 50 and, correspondingly, steam chamber 12.

In another exemplary embodiment, high vacuum pump 57, shown in FIG. 2 in dashed lines, is connected directly to pipe 40 by flange connection 44 to draw a vacuum on steam chamber 12. In this embodiment, pipe 42 is disconnected from flange connection 44 and pipe 59 is connected to flange connection 44. Ball valve 38 is then opened, placing high vacuum pump 57 in fluid communication with stem chamber 12 via pipe 36 and T-valve 28. Once a sufficient vacuum is achieved, e.g., the vacuum within steam chamber 12 is approximately 500 mTorr or less, ball valve 38 is closed and pipe 59 is disconnected from flange connection 44. Pipe 42 may then be connected to flange connection 44 and ball valve 48, 54 opened to draw a vacuum on pipe 42 and evacuate the same via vacuum pump 56. Ball valve 48 may then be closed and a supply of deaerated water delivered to steam chamber 12, as described below.

To create deaerated water to fill the interior of steam chamber 12, as described in detail below, a supply of distilled water is held within tank 58. Water flows in serial order from tank 58 through pipe 60, ball valve 62, pipe 64, ball valve 66, pipe 68, ball valve 70, and pipe 72 to arrive at deaerator 74. Thus, during filling of steam chamber 12, ball valve 80 remains closed to force water through open ball valve 66 and along the path previously described. However, to prime the deaeration system or to otherwise purge air from the same, ball valve 66 may be closed to diverted distilled water from tank 58 through pipe 75. Distilled water from tank 58 may then be pumped by water pump 77 through the deaeration system to prime the deaeration system in preparation for filling steam chamber 12. Additionally, in the event air has infiltrated the deaeration system, e.g., if vacuum pump 56 is turned off for an extended period of time, water pump 77 may be used to flush the deaeration system by forcing distilled water from tank 58 through the deaeration system.

Deaerator 74 includes a plurality cylindrically shaped semi-permeable membranes extending from end 76 of deaerator 74 to opposing end 78. As distilled water from tank 58 enters deaerator 74, the distilled water is forced into a space between the outer wall of the deaerator membrane and the inner wall of deaerator housing 79. At the same time, a vacuum is drawn on the hollow interior of the deaerator membrane. By creating an area of lower pressure in the hollow interior of the membrane, dissolved gasses within the distilled water are pulled through the deaerator membrane and into the hollow interior, while the flow of distilled water into the hollow interior of the membrane is prevented. Specifically, the deaerator membrane has small hydrophobic pores that prevent the passage of liquid water, but allow for the passage of gaseous substances, such as dissolved air, therethrough. Advantageously, by utilizing deaerator 74, the need to heat the distilled water contained within tank 58 to deaerate the same is eliminated. Thus, the temperature of the distilled water traveling through the deaeration system is maintained at a temperature substantially similar to the temperature of the ambient environment. For example, the temperature of the distilled water may be maintained below 100°, 125°, 150°, or 212° Fahrenheit during each step of the present process.

To create a vacuum in the hollow interior of the deaerator membrane, vacuum pump 56 is placed in fluid communication with the center of the deaerator membrane. Specifically, ball valve 48 is closed and ball valve 82, adjacent vacuum pump 56, is opened to place vacuum pump 56 in fluid communication with vacuum regulator 84. Vacuum regulator 84 helps to keep the pressure within deaerator 74, i.e., the vacuum created by vacuum pump 56, constant. Positioned adjacent vacuum regulator 84 and its corresponding piping is pressure gauge 86. Pressure gauge 86 provides constant, visual feedback to the operator regarding the pressure within pipe 88.

As shown in FIG. 2, pipe 88 is connected to end 78 of deaerator 74 and is in fluid communication with the hollow interior of the deaerator membrane. Similarly, pipe 90 is connected to end 76 of deaerator 74 and is in fluid communication with the interior of the deaerator membrane and pipe 88. Thus, a vacuum is drawn at both end 76 and end 78 of deaerator 74. Connected to pipe 88 is ball valve 92 and filter 94. Filter 94 provides vent 96 for releasing vacuum from deaerator 74. Additionally, connected to pipe 90 is ball valve 98 and drain pipe 100. By opening ball valve 98, condensed water that may have inadvertently passed through the deaeration membrane may be drained from the system.

The now deaerated water exiting deaerator 74 travels through pipe 102 to a flow controller, such as flow indicating controller 104. Flow indicating controller 104 monitors the flow of deaerated water therethrough and, once the amount of water passing through pipe 102 and into pipe 106 reaches a programmed, predetermined amount, flow indicating controller 104 activates solenoid valve 108 to stop the flow of water through pipe 106. Additionally, positioned between pipe 106 and solenoid valve 108 is needle valve 110. Needle valve 110 may be adjusted so that the speed with which water passes through solenoid valve 108 and, ultimately, enters steam chamber 12 may be varied. After exiting solenoid valve 108, deaerated water travels through pipes 112, 42, 40, 36 and ball valves 46, 38 to enter T-valve 28.

To fill a steam chamber utilizing the above-described apparatus, the following method may be utilized. Referring to FIG. 3, with T-valve 28 attached to fill port 30 of steam chamber 12, as described in detail above. Once in this position, ball valves 38, 46 are closed and ball valves 54, 48, 82 opened. Vacuum pump 56 may then be activated, causing vacuum pump 56 to draw a vacuum on pipes 52, 50, 42, 40. Once a sufficient vacuum has been drawn, as indicated by pressure gauge 86, ball valve 38 is opened and rod 32 is actuated in the direction of arrow A to place T-valve 28 in fluid communication with the interior of steam chamber 12. As a result, a vacuum is drawn via pipe 36 and T-valve 28 on steam chamber 12. Once pressure gauge 35 indicates a pressure equal to or below a predetermined, acceptable pressure, ball valve 48 is closed.

At this point, deaerated water must be added to steam chamber 12. To facilitate adding the appropriate amount of deaerated water, flow indicating controller 104 is programmed to stop the flow of deaerated water after a predetermined amount has passed therethrough. This predetermined amount corresponds to the amount of deaerated water needed to fill steam chamber 12 to the desired level. Once flow indicating controller 104 is programmed, ball valve 82 is opened, allowing vacuum pump 56 to draw a vacuum on the interior of the deaerator membrane via pipes 88, 90. With ball valves 92, 98 closed, the vacuum on the interior of the deaerator membrane increases. Ball valves 62, 66, 70, 46, 38 are now opened to allow distilled water to flow from tank 58 through pipes 60, 64, 68, 72 and deaerator 74, in serial order.

The now deaerated water continues in serial order through pipe 102, flow indicating controller 104, pipe 106, needle valve 110, solenoid valve 108, pipe 112, ball valve 46, pipe 42, flange connection 44, ball valve 38, pipe 36, and T-valve 28 to enter steam chamber 12. Due to the vacuum previously drawn on steam chamber 12, the deaerated water will be sucked from tank 58, which is maintained at atmospheric pressure, into steam chamber 12 along the path described above. As a result, needle valve 110 may be adjusted to regulate the speed at which deaerated water passes therethrough and ultimately enters steam chamber 12. As the deaerated water flows, flow indicating controller 104 registers the amount of deaerated water that has passed therethrough and may display the amount remaining to fill steam chamber 12 to the predetermined level. Alternatively, flow indicating controller 104 may display the total volume of deaerated water that has passed therethrough. Once flow indicating controller 104 determines that the programmed amount of deaerated water has passed therethrough, solenoid valve 108 is actuated into the closed position via electronic connection 120.

Once solenoid valve 108 has been closed, ball valve 38 is closed and rod 32 depressed in the direction of arrow B of FIG. 3. Referring to FIG. 2, attached to the end of rod 32 on post 122 is plug 124, which is dimensioned to substantially prevent fluid communication with steam chamber 12. Plug 124 is externally threaded and configured to threadingly engage the interior of fill port 30. By depressing rod 32 in the direction of arrow B, plug 124 engages the interior of fill port 30 and, as rod 32 is rotated, plug 124 threading engages fill port 30 to firmly seat plug 124 therein. Once plug 124 is seated within fill port 30, rod 32 may be actuated in the direction of arrow A and post 122 disengaged from plug 124. T-valve 28 may then be unthreaded from the exterior of fill port 30. In this manner, fill port 30 is plugged and the vacuum within steam chamber 12 maintained. With T-valve 28 removed from fill port 30, cap 126, shown in FIGS. 4-5, is positioned over fill port 30 and secured thereto via weld 128.

Although the specific embodiment of the apparatus described herein sets forth various connections for drawing a vacuum on a steam chamber and filling the same with deaerated water, any myriad of connections, valves, piping, or other mechanisms may be utilized to accomplish the same result. Thus, while this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A valve configured to be attached to a housing forming a chamber and a water tank, the valve comprising:
   a valve housing selectively securable to the housing forming the chamber for fluid communication with the chamber;
   a rod movable relative to said valve housing;
   a plug selectively engaged with the rod, the plug comprising a fastener, the plug dimensioned to restrict fluid communication with the chamber and thereby maintain the pressure in the chamber,
   wherein said rod is moveable between a first position in which said valve is in fluid communication with the chamber and a second position in which said plug substantially prevents fluid communication between said valve and said chamber, said plug securable with the fastener to the housing forming the chamber in the second position, the plug disengageable from said rod with the valve housing secured to the housing forming the chamber and the plug secured by the fastener to the housing forming the chamber in the second position in which the plug substantially prevents fluid communication between said valve and said chamber, whereby said plug is positionable to restrict fluid communication with the chamber with the valve attached to the housing forming the chamber and then the plug is disengageable from the rod with the valve housing secured to the housing forming the chamber to remain in position to restrict fluid communication with the chamber after the valve housing is removed from the housing forming the chamber,
   in combination with a steam chamber, a source of a quantity of heat transfer medium, and a vacuum pump, wherein the valve is connected to the steam chamber and in selective communication with the source of heat transfer medium and the vacuum pump, and
   wherein said source of the quantity of heat transfer medium further comprises a deaerator and a second vacuum pump.

2. The valve of claim 1, wherein said fastener comprises threads formed on the plug, said threads configured to threadingly engage corresponding threads on a port of the chamber.

3. The valve of claim 2, wherein said threads on said plug are configured to threadingly engage said corresponding threads on said port of the chamber when the rod is rotated.

4. The valve of claim 1, wherein the valve is a T-valve.

5. The valve of claim 1 further comprising a pressure gauge, wherein the pressure gauge is in fluid communication with the chamber when the rod is in the first position and the pressure gauge is not in fluid communication with the chamber when the rod is in the second position.

6. The apparatus of claim 1, wherein said deaerator comprises a membrane separator.

7. The apparatus of claim 6, wherein the membrane separator includes a semi-permeable membrane.

8. The apparatus of claim 7, wherein the semi-permeable membrane includes small hydrophobic pores that prevent the passage of liquid water by allow for the passage of gaseous substances therethrough.

9. The apparatus of claim 6, wherein the second vacuum pump is configured to draw a vacuum on an interior of the membrane separator to pull dissolved gases through the semi-permeable membrane while the semi-permeable membrane prevents passage of the heat transfer medium therethrough.

10. The apparatus of claim 1, wherein said quantity of heat transfer medium comprises deaerated water.

11. The apparatus of claim 1, further comprising a flow controller in communication with said source of the quantity of heat transfer medium, whereby said flow controller starts and stops a flow of the quantity of heat transfer medium to said valve when said valve is in communication with said source of heat transfer medium.

12. The apparatus of claim 1, wherein said valve comprises a fill port valve configured for connection to a fill port of the steam chamber, said fill port valve further comprising a rod having a plug carried thereon.

13. The apparatus of claim 1, wherein the fastener of said plug includes threads formed on the plug, said threads configured to threadingly engage corresponding threads on a fill port of the housing forming the chamber.

14. The apparatus of claim 1, wherein the quantity of heat transfer medium is liquid water.

\* \* \* \* \*